United States Patent [19]

Corrie et al.

[11] Patent Number: 4,494,717
[45] Date of Patent: Jan. 22, 1985

[54] VITAL TRANSMISSION CHECKING APPARATUS FOR COMMUNICATION CHANNELS

[75] Inventors: John D. Corrie, Chippenham; Mark A. Tooley, Bristol, both of England

[73] Assignee: Westinghouse Brake & Signal Co., Ltd., Chippenham, England

[21] Appl. No.: 307,355

[22] Filed: Sep. 30, 1981

[30] Foreign Application Priority Data

Oct. 7, 1980 [GB] United Kingdom ............... 8032218
Mar. 21, 1981 [GB] United Kingdom ............... 8108925

[51] Int. Cl.³ ............................................. B61L 21/00
[52] U.S. Cl. ............................... 246/28 F; 246/34 B; 371/3; 371/48
[58] Field of Search ............ 340/518; 246/28 F, 34 R, 246/34 B; 371/3, 48; 375/108, 110

[56] References Cited

U.S. PATENT DOCUMENTS

| | | | |
|---|---|---|---|
| 2,160,640 | 5/1939 | Bossart . | |
| 2,160,894 | 6/1939 | Nicholson . | |
| 2,350,620 | 6/1944 | Judge . | |
| 2,798,213 | 7/1957 | Rowell | 371/48 |
| 2,798,214 | 7/1957 | Rowell | 246/28 F |
| 3,492,643 | 1/1970 | Sibley | 371/52 |
| 3,535,681 | 10/1970 | Coley et al. . | |
| 3,701,019 | 10/1972 | Jackson | 371/48 |
| 4,241,447 | 12/1980 | Epstein | 371/3 |

Primary Examiner—James J. Groody
Attorney, Agent, or Firm—A. G. Williamson, Jr.

[57] ABSTRACT

Vital transmission checking apparatus is disclosed for a communication channel which transmits quasi-static signals representing several alternative states of a function, e.g., the control function for a signal in a railway control system, one of which states is potentially unsafe. Each function channel transmits a digital signature code of predetermined length which is continuously repeated in a selected form, e.g., non-inverted, inverted, or alternately inverted and non-inverted, to represent the different states of the function. To provide a check of proper transmission, the repeated signature code is periodically corrupted in accordance with a predetermined error pattern which is repeated at a lower repition frequency than the code. The channel receiver is so designed that its output can only be held in the selected state when both the signature code and the error pattern in the received signal are correct. If a fault is detected, the receiver output is shifted to the most safe state of the function.

10 Claims, 6 Drawing Figures

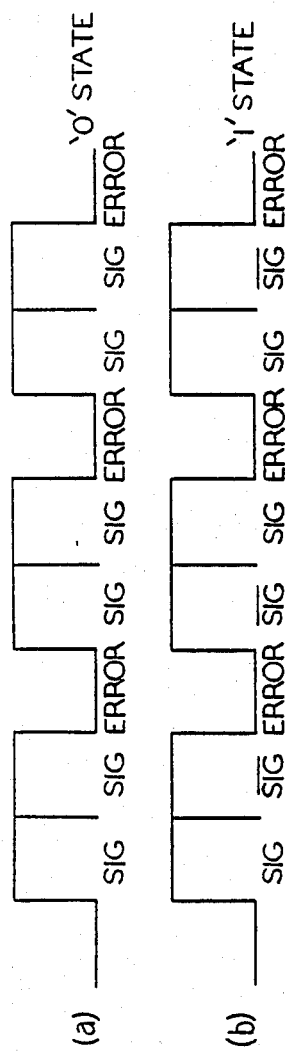
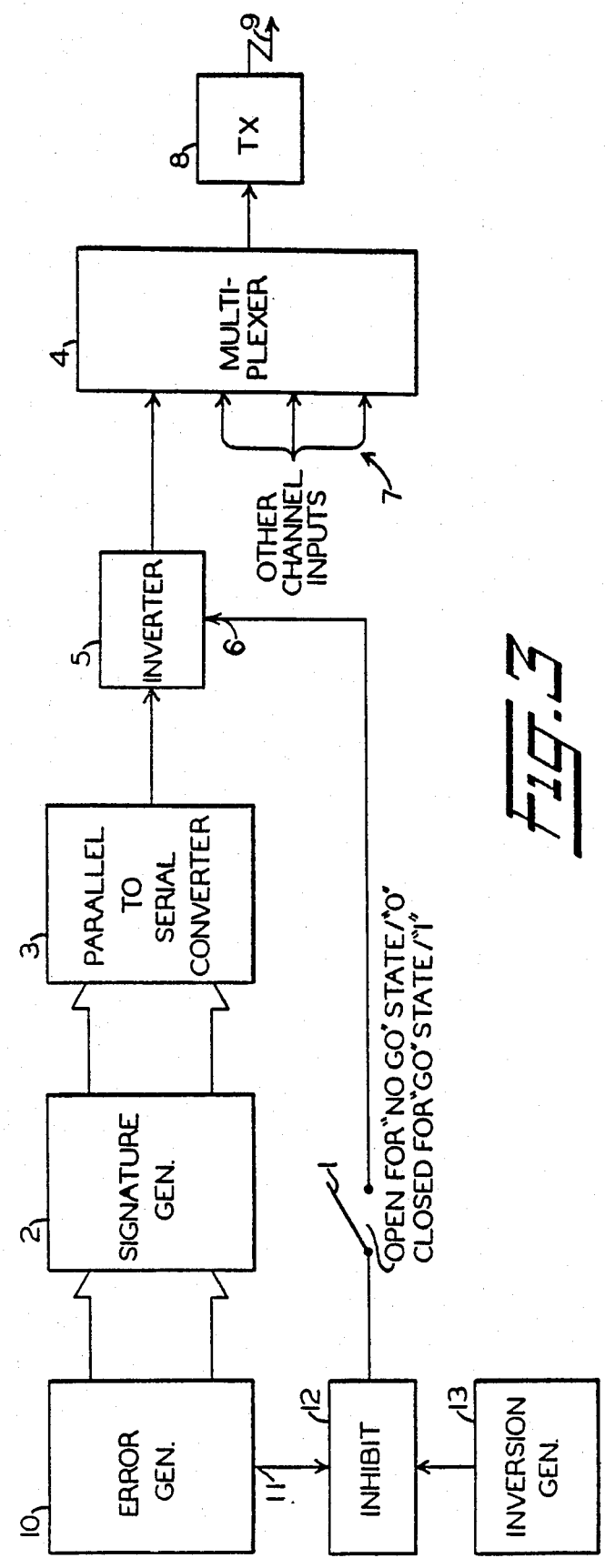

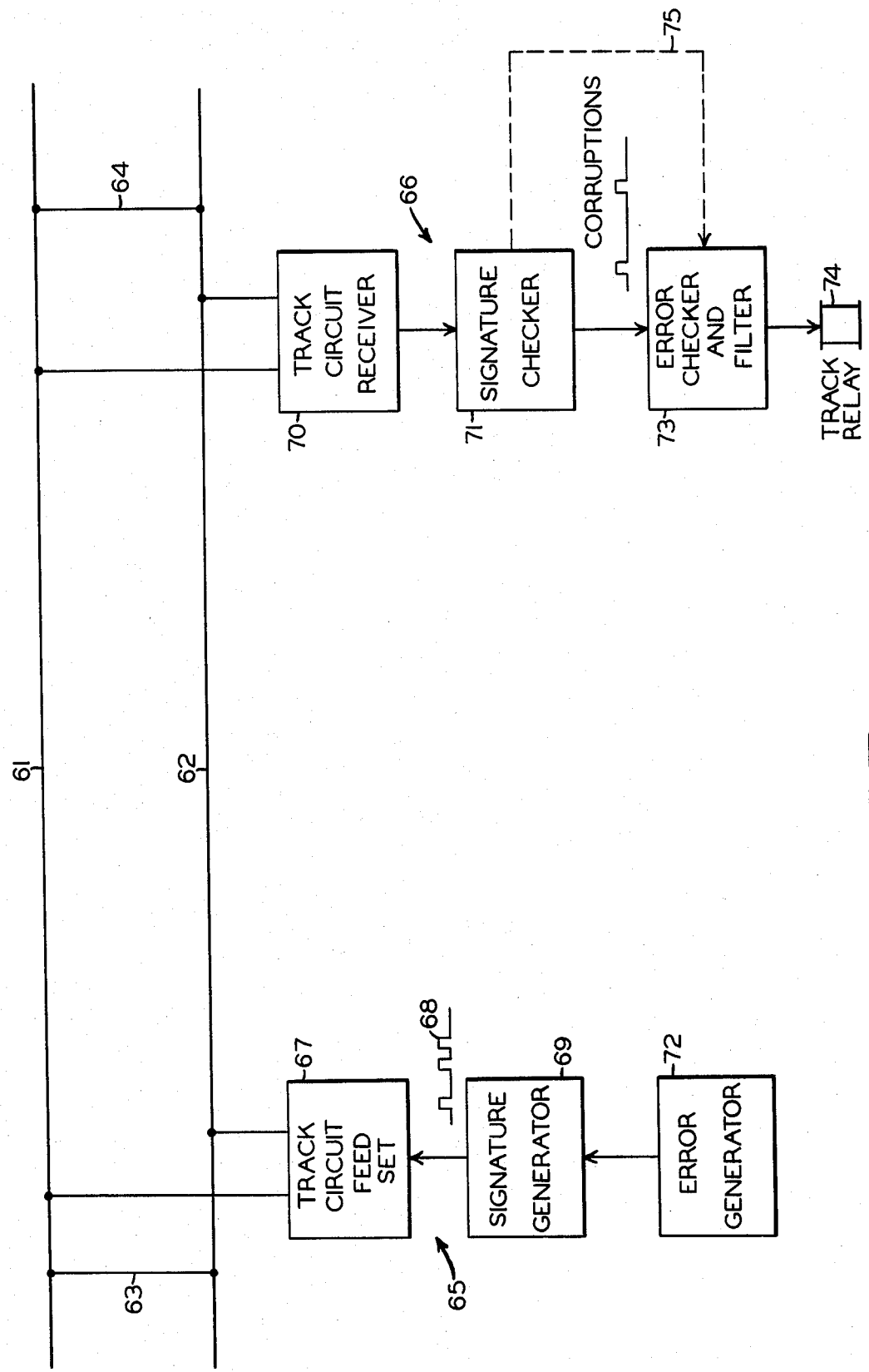

VITAL TRANSMISSION CHECKING APPARATUS FOR COMMUNICATION CHANNELS

FIELD OF THE INVENTION

Our invention relates to vital transmission checking apparatus for communication channels used in vital control systems. More particularly, but not exclusively, the invention pertains to vital transmission checking apparatus for a communication channel used for transmitting control and indication functions in a railroad signaling system.

BACKGROUND OF THE INVENTION

Railway control system grow increasingly more complex and the controlled area larger as modern centralized traffic control methods are implemented. Since the areas controlled extend over long distances of track and employ a large number of switch machines, signals, and track circuits, each of which is connected to the central control office, the communication means provided for carrying control signals must at least maintain the traditional standards of vital railway safety.

Safety philosophy in railway control dictates that any control signal must be proved to be genuine before it can be acted upon and, moreover, a change to a further control state can only be implemented when the further control signal has been proved to be genuine. Similar criteria also apply to signals which only indicate, e.g., those which indicate whether a track circuit is occupied or unoccupied should, if faulty, indicate an occupied state. Reliability is of great importance, that is, there should be the highest possible mean time between failures. But of even greater importance is the continued integrity or vital operation of the system so that when any fault occurs which can result in a wrong command or status indication being given, then that command or indication signal must automatically go to its most safe state. Failure to safety requirements impose an overriding dictum that where any control signal cannot be proved genuine, or upon occurrence of any failure, the system must remain in or automatically revert to its most safe state.

In design of the system, it may be that the most safe state is also an operating state, as in the case of track circuits indicating the location of a train and signal lamps controlling the passage of a train. Thus in the course of normal fault free operation, those states may be selected. Confidence in the control system will be greater if a distinction is drawn between a failure to a safe state and genuine operation to that state. In the latter case, it is implied that another operational state can be selected at will, subject to safety restraints, but in the former case remedial action has to be carried out. Further, in a railway control system, the control signals may not be required to change for long periods of time, i.e., they are quasi-static, so that a build up of uncorrected faults may lead to an unsafe situation from wrong assumptions made when diagnosis of multiple faults is attempted. This is particularly true of multiplexed communication systems where many control paths share common equipment.

Accordingly, an object of our invention is communication channel apparatus for checking the proper transmission of digital signature codes by periodically transmitting an error signal whose receipt is checked by corresponding programmed receivers.

Another object of the invention is communication apparatus for transmitting digital codes over a communication channel in which periodic, varied errors are included to actuate an error check element at the receiver location which registers a transmission fault if the error check does not correspond to a predetermined pattern.

A further object of the invention is to provide a communication channel for use in a railway control system which is vital in operation and which can distinguish whether the channel output corresponding to a safe state is operating in that state or has failed.

Yet another object of the present invention is apparatus for checking the operational status of a quasi-static digital communication channel comprising a transmitter including a signature pattern generator connected to provide for transmission of an output having a periodic signature and an error pattern generator operative to periodically corrupt the signature pattern at a rate less than the signature repetition rate, a transmitting medium, and a receiver including a signature detector operative to correlate the reception of successive signatures to energize a receiver output and an error pattern detector operative over a plurality of signature periods to correlate the pattern of received errors to prove that the channel has not failed to a mode corresponding to the receiver output energized.

Other objects, features and advantages of the invention will become apparent from the following description and appended claims when taken in connection with the accompanying drawings.

SUMMARY OF THE INVENTION

According to the invention, there is provided a communication channel of the kind in which information of a quasi-static nature is conveyed in the form of a digital signature or code continuously repeated at a first frequency. The signature transmitter of the channel includes means for periodically corrupting the repeated signature according to a predetermined error pattern having a second repetition frequency lower than the first repetition frequency. The receiver part of the channel is responsive to the signature and the correct error pattern in combination to hold an output state corresponding to the quasi-static information conveyed.

In one specific form of the invention, the information corresponds to the setting of a device in either a first safe state or a second non-safe state wherein only an indication of the non-safe state is represented by continuous repetition of a signature. Then, for the channel output to hold an idication of a non-safe state, a received signal must comprise the particular signature of the channel and the error pattern must be correct. In a second form, both the safe and the non-safe state are represented by respective signatures so that an indication of a safe state may be held by a received signal comprising the appropriate signature and the correct error pattern or if the channel output has failed safe.

BRIEF DESCRIPTION OF THE DRAWINGS

Before defining the invention in the claims, we will described in more detail two forms of communication apparatus embodying the invention, as illustrated in the accompanying drawings, in which:

FIG. 2 is an illustration of the sequences for alternative operating states of a GO/NO GO system.

FIG. 3 is a schematic block diagram of the transmitter apparatus for one form of a multi-channel communication system embodying the invention.

FIG. 6 shows a schematic diagram of a railway track circuit embodying the invention.

In each of the drawings, the same or similar reference characters designates similar parts of the apparatus.

DESCRIPTION OF THE ILLUSTRATED EMBODIMENTS

Figure 1:
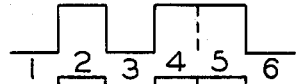
FIG. 1 is a chart illustrating a periodically corrupted coded signal sequence used with the apparatus of the invention.

Referring to the drawings, FIG. 1 shows a series of coded digital signals assigned to one operating state of a vital railway signaling system and which is transmitted via a digital communication channel. The coded signal comprises a digital word or signature of m digital bits length. Specifically herein, as shown at the top of the drawing, m=6 and the correct signature is 010110. In order to signal a particular operating state, which we shall call the '0' state, the signature is continuously repeated at a first repetition frequency. Every nth signature, the coded signal is corrupted and is transmitted with one bit in error, that is, inverted. In this example, n=3 so that in the third repetition the first bit is inverted, in the sixth repetition the second bit is inverted, in the ninth repetition the third bit is inverted, and so on. Thus, after a period of time the signature will have been transmitted with every bit in error once, together with a corresponding number of correct transmissions, the error pattern repeating every n.m. transmissions, i.e., every 18 signatures.

In FIG. 2, the sequence of repeated signatures for the '0' state is illustrated at (a) and shows that every third signature repetition contains an error. In a system having two operating states, the alternative state, here called the '1' state, is assigned a signature in which the same digital word is alternately transmitted inverted and non-inverted, as shown at (b). Again every third signature period contains one bit in error. As will be described below, this technique of assigning a signature to a transmission channel and using it in a first form to represent a first operating state and in an inverted form to represent a second operating state enables a multiplicity of communication channels to be safely established through a single multiplexed link.

FIG. 3 shows a diagrammatic representation of the encoder and transmitter of a multi-channel digital transmission system using time domain encoding, as described above with reference to FIGS. 1 and 2. The transmitter also employs time division multiplexing to enable a multiplicity of channels to be transmitted via a common transmission medium.

Each channel, only one of which is shown in FIG. 3, comprises a lower frequency or quasi-static data input of a "GO/NO GO" type governed by the setting of a switch, generally indicated at 1, which may be a contact of a relay forming part of a railway signal interlocking system. The channel has assigned to it a unique digital word or signature which is stored in a hardwired signature memory 2. An output from memory 2 is provided by a parallel register (not shown) connected to a parallel to serial converter 3. The digital signature in serial format is then supplied to a multi-channel input time division multiplexer 4 through a switched inverter circuit 5. This circuit element is operatively responsive to an inversion signal applied at terminal 6 to invert each serial digital bit of a signature sequence. The inversion signal is transmitted from an inhibit circuit 12, to be described, connected through the switch 1 to terminal 6. Thus, when switch 1 is closed and an inversion signal is applied at terminal 6, each serial digital bit of a signature is inverted. When no inversion signal is present or switch 1 is open, the serial digital bits are not inverted.

The time division multiplexer 4 includes a multiplicity of parallel inputs, generally indicated at 7, connected to similar serial digital outputs from like channels, not shown. The time division multiplexed output of block 4 is connected, for example, to a fiber-optic transmitter 8 comprising a digital voltage to current converter (not shown) which drives a light emitting diode by means of which the digital electrical pulses are converted to light energy pulses carried by a fiber-optic transmission link 9 to a fiber-optic receiver 20, which feeds the data to the receiver circuits as will be described with reference to FIG. 4. It will be understood that other types of multiplexed communication links may be used.

The error pulse output of an error generator 10 is connected to the register in generator 2 to effect corruption of one bit of the digital word when an error pulse is generated. A second output 11 or error generator 10 is connected to a first input of a signal inhibit circuit 12 comprising an electronically controlled switch operative to pass or inhibit a signal connected to its other input. This latter signal is an inversion signal produced by an inversion signal generator 13, the output of which is connected via inhibit circuit 12 and through switch 1 to terminal 6 of inverter circuit 5.

The clock generator and timing circuits, all of conventional design and operation, are omitted from FIG. 3 for clarity. However, it will be clear to one skilled in the art, from the following description of the operation of the transmitter, how the timing circuits are arranged for correct functioning of the transmitter.

In operation, a digital word signature, e.g., the six-bit digital word of FIG. 1, is repeatedly read through the hardwired memory of signature generator 2 into the parallel output register and from there into the parallel to serial converter 3. The signature is then clocked in serial format through inverter 5 to the appropriate channel input to multiplexer 4. When the signature is to remain uninverted, i.e., as read from the memory, to indicate a '0' state (see FIG. 2(a)), then inverter 5 remains inoperative. If a '1' state is to be indicated as in FIG. 2(b), inverter 5 receives a signal at terminal 6 from inversion generator 13 comprising either a single pulse of the same duration as, and in synchronism with, the serial signature word to be inverted or an appropriate number of pulses in synchronism with the serial signature bits of the signature to be inverted.

As will be seen from FIG. 2, every third signature word is corrupted by a single bit error produced by error generator 10. The error bit or pulse is generated every third signature period on the appropriate one of the parallel output lines connected between the error generator 10 and the output register of generator 2. Each time a new error pulse is generated, it is routed to the next output line in turn, so that after a period of time the signature will have been transmitted with every bit corrupted. According to the operating rules of the receiver, as will be described below with reference to FIG. 4, in a signal representing a '1' state it is only possible to detect a corrupted bit in a non-inverted signature. Therefore, in this state, the operation of inverter 5 is temporarily inhibited when an inversion operation coincides with a corrupted signature by means of inhibit circuit 12 being actuated by a further output from error generator 10 during the period of the appropriate serial signature.

All channels function in an identical manner employing their respectively assigned signature words and in synchronism so that the multiplexer receives a multiplicity of corresponding signature bits in synchronism. The multiplexer 4 is clocked at an appropriate multiple of the signature bit rate to time division multiplex all the corresponding bits of the channel signatures in a predetermined order onto the single input line controlling energization of the optical transmitter 8.

Figure 4:
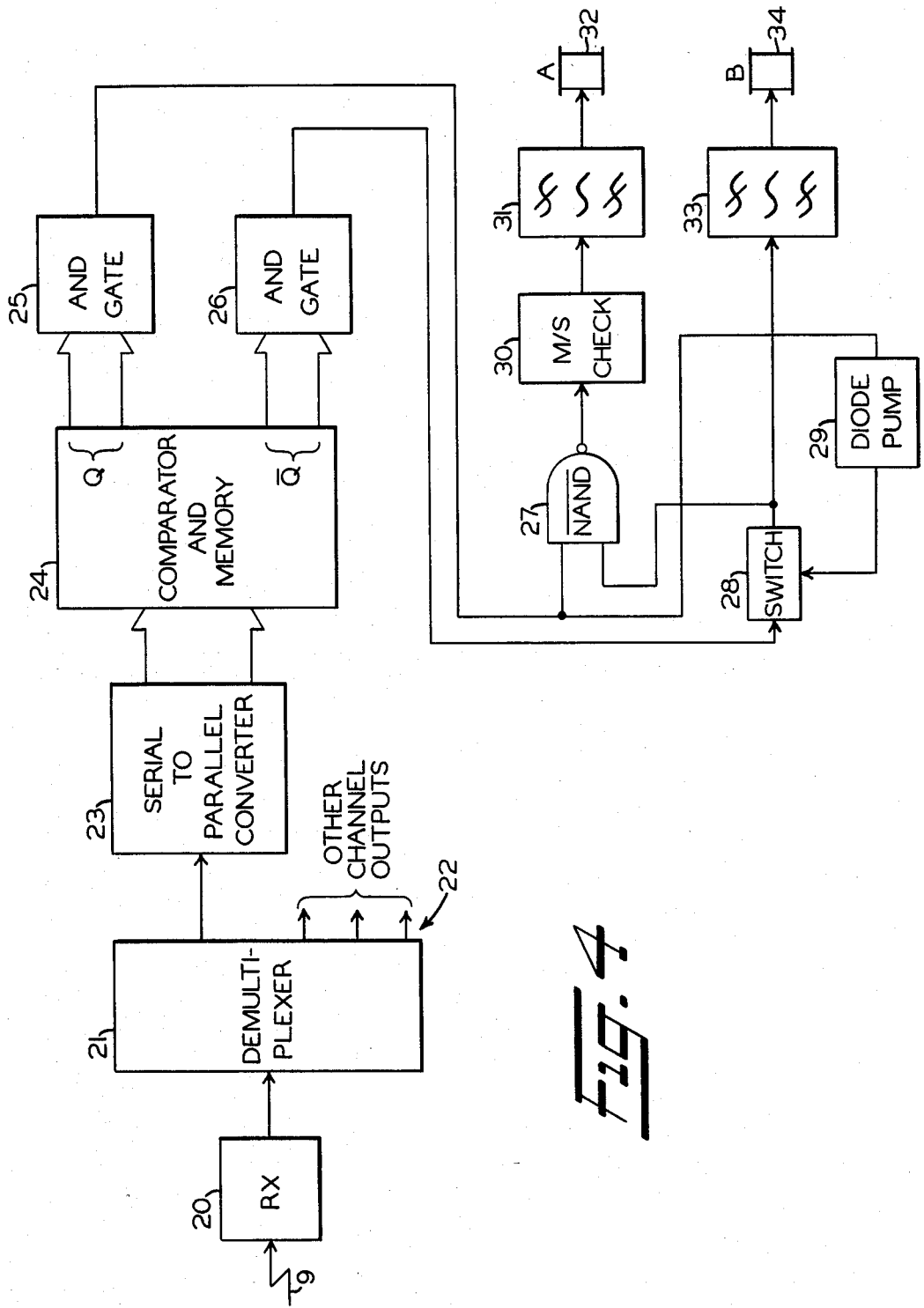
FIG. 4 is a schematic block diagram of receiver apparatus which cooperates with the transmitter of FIG. 3.

FIG. 4 shows a diagrammatic representation of the receiver and decoder of the multi-channel digital system comprising an optical receiver 20 connected to the fiber-optical link 9 to receive encoded light pulses from optical transmitter 8 in FIG. 3. Received light pulses are converted back to pulses of electrical energy in receiver 20 and these pulses are connected to a multi-channel demultiplexer 21 which has a plurality of outputs, generally indicated at 22, connected to respective channels only one of which is shown.

In the channel shown, the demultiplexer output is connected to a serial to parallel converter 23 comprising a shaft register which provides a parallel output consisting of the digital signature word assigned to that channel in non-inverted, inverted, or corrupted form as appropriate. The parallel outputs from converter 23 are supplied to a comparator stage 24 effectively comprising two parallel comparator sections. The first comparator section, designated Q in the drawing, compares the received signature with a hardwired memory of a non-inverted form of the channel signature and has the same number of comparator outputs as there are signature bits. The second comparator section, designated $\overline{Q}$ in the drawing, compares the same received signature with an inverted form of the channel signature in the hardwired memory, and also has the same number of comparator outputs as there are signature bits.

The outputs from the Q and $\overline{Q}$ comparator are connected respectively to a like number of inputs of AND gate circuits 25 and 26. Each of said inputs further includes an A.C. only AND gate (not shown) so that gates 25 and 26 can only produce outputs when two conditions are met; first, the normal logic requirement that all inputs agree and second, that all inputs are also alternating or "dynamic". The output from AND gate 25 is connected to a first input of a two input NAND gate 27. The output from AND gate 26 is connected to the second input of gate 27 through a switch 28, the operation of which is controlled by a diode pump circuit 29 which receives an input from the output of AND gate 25.

The output of gate 27 is connected to a mark to space ratio checking circuit 30 constructed and arranged to check for a signal corresponding to the correct ratio (2:1) of uncorrupted to corrupted signatures as shown in FIG. 2. Essentially the circuit 30 consists of a clocked linear ramp or staircase generator periodically reset by the waveform provided by NAND gate 27. The ramp clocking rate is a multiple of, e.g. fifteen times, the signature rate and dependent upon the corruption ratio produced by an alternating waveform. Preferably the circuit further includes an output level detector arranged to switch at a convenient threshold level in order to produce a rectangular output waveform at the corruption rate. This output waveform is filtered by a band pass filter 31 having as its center frequency the corruption frequency. The output of the filter is then suitably amplified and used to energize a relay A, indicated by reference 32. Thus relay A is only energized when there are no failures in this channel. The output of AND gate 26 is connected through switch 28 to band pass filter 33, the center frequency of which is the signal frequency of AND gate 26, to energize a relay B, indicated by reference 34.

In operation, the light pulses in the fiber-optic link 9 are converted into digital electrical pulses by receiver 20 and demultiplexed and routed to the appropriate channel by demultiplexer 21 in the reverse manner to that in the transmitter of FIG. 3. Comparator 24 compares the received parallel signatures with both the stored non-inverted and inverted forms and, dependent upon which is matched, the parallel outputs of either the Q or $\overline{Q}$ sections are all '1', in conventional logic sense.

Thus, AND gates 25 and 26 will produce a '1' output when either the corresponding non-inverted or inverted signature form, respectively, is matched and a '0' output when the signature form is not matched. In addition, since only non-inverted signature forms are corrupted by the error generator 10, the output of gate 25 will also be '0' whenever a corrupted signature is detected. The outputs of the two AND gates 25 and 26 are summed by NAND gate 27 which therefore produces a high output only when an error bit is present in a signature. The diode pump 29 is arranged to maintain switch 28 closed in response to the continued presence of a changing logic state on the output of gate 25. Thus, the output of gate 26 is only connected to gate 27 and through the filter 33 to relay B (34) when the output of gate 25 is changing state.

The output from NAND gate 27 is connected to the mark to space checking circuit 30 and only if the waveform possesses the correct ratio will the output of circuit 30 present the correct frequency to be passed through the filter 31 to energize relay A (32). Thus, at the output of the receiver channel, the relay A (32) only will be energized when the received signature is correct, non-inverted, and is corrupted by the correct error waveform. If the received signature is correct, periodically inverted as in FIG. 2(b), and is correctly corrupted, then both A and B relays 32 and 34 will be energized. The system is thus vital in its operation since if any other signature waveform occurs, a relay will be de-energized. Thus relay A is energized while the system is free from faults, and relay B is energized when a "GO" output state is required. Relay A may operate a system alarm and relays A and B together may be used to effect signaling controls.

Figure 5:
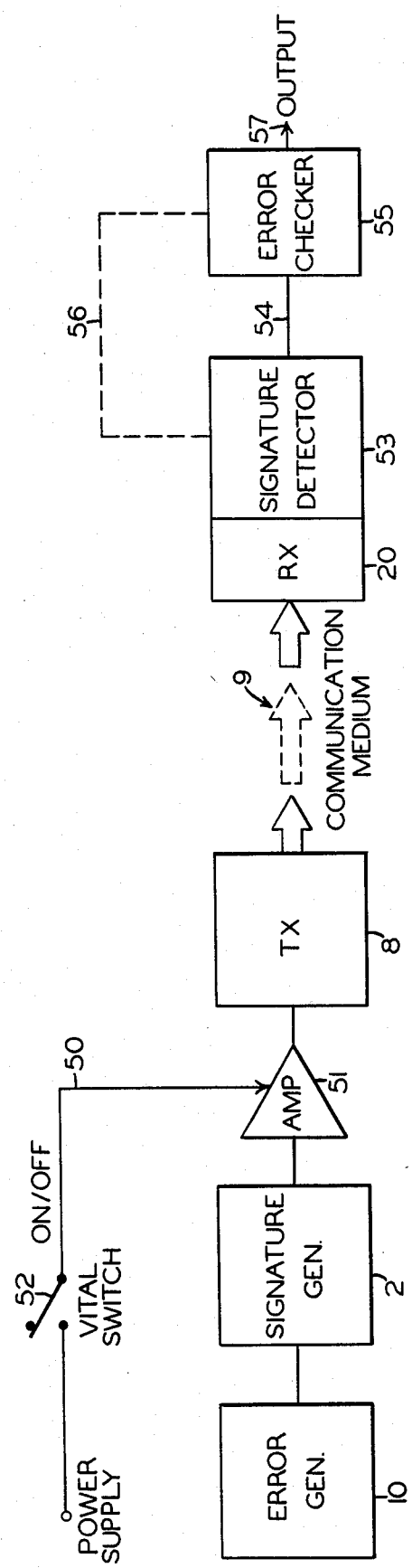
FIG. 5 shows a general arrangement of a communication channel embodying another form of the invention.

Referring now to FIG. 5, shown in block diagram form is a communication channel for conveying a "GO/NO GO" type signal in which only one state is represented by a continuously repeated signature and the other state is to be assumed in the absence of the signature. The arrangement of FIG. 5 is a simplified form of that shown in FIGS. 3 and 4 and comprises a transmitter 8, a communication medium 9 of unspecified nature, and in appropriate receiver 20. In the transmitter apparatus, a quasi-static vital input 50, comprising a transmitter on/off signal generated by a vital on/off switch 52, is applied to an amplifier 51 which controls the connection of a digital signature generator 2 to the input of transmitter 8. Thus, in operation, when the switch 52 is closed, the characteristic signature is transmitted and represents a state '1' and, when the switch 52 is open, the signature is not transmitted which condition is taken to represent a state '0'. As far as the invention is concerned, the transmitter 8 is effectively "off" when the characteristic signature is not being transmitted but, in practice, it may conveniently be switched into some other transmitting state not containing the signature. For example, in the case of a radio transmitter, this "off" state may be just a carrier signal. The actual medium of communication employed may be of any suitable form including telephone, radio transmission, microwave transmission, or optical link, with either dedicated channel or multiplex techniques being used.

An error pattern generator 10 is connected to error control inputs on the transmitter signature generator 2. The arrangement is such that a predetermined output from generator 10 gives rise to an error in the output of generator 2. For example, in one communication channel, as previously described, the signature comprises a frame or word of m digital bits and the error pattern comprises a single digital bit occurring with a period of n signatures, so that each time an error bit occurs a different bit of the signature is inverted. Thus the combined signature/error pattern is repeated only every m.n. frames. Said in another way, in order to guarantee safety in the corrupted signature generation and detection process, it is necessary to shift the corrupted bit. For example, in a consecutive series of signatures, in the first corrupted period the first bit of the signature may be inverted, in the next corrupted period the second bit of the signature may be inverted, in the next corrupted frame the third bit of the signature may be inverted and so on in consecutive corrupted periods. It is also preferred to employ as characteristic signatures only digital signal patterns which contain no subpatterns in the signature period.

At the receiver end of the channel, the receiver 20 is connected to a signature detector 53, the output 54 of which is in turn connected to an error checker 55. The signature detector 53 includes a memory device containing the signature of the channel with which the signature in a received signal is compared. The output 54 is energized when an uncorrputed signature is received and de-energized when a signature containing an error is detected. The error checker 55 incorporates circuits designed to vital principles which check the signal 54 for the correct frequency of errors, for the correct ratio of corrupted to uncorrupted signatures received, and further monitors (56) that all m bits are corrupted once in every m.n. frames. The output 57 of error checker 55 is arranged to be energized only if all the aforementioned checks are satisfactory, otherwise it fails to safety and assumes the de-energized state. Thus the energized state of the output 57 is only achieved when switch 52 is closed and there are no permanent or transitory failures in the communication channel system.

In operation, when switch 52 is closed, a continuously repeated, periodically corrupted signature is transmitted and the receiver responds, when correlation of both the signature and error patterns are achieved, by producing a high output 57. When switch 52 is open, the signature signal is not transmitted. Consequently, the output signal 54 from signature detector 53 in the receiver and the error detector output 57 occupy a low or de-energized state. Conceivably, interference from other signal sources cold result in the signature signal of the channel being spuriously generated. The probability of this occurrence is dependent upon a number of factors, e.g., the proximity of other channels having related signatures. However, it is extremely improbable that a signature so generated will also have a correct error sequence. This probability can be still further reduced by increasing the level of correlation necessary in the detection process for both the signature and error patterns. The greater the level of correlation required to produce a high state at output 57, the longer is the response time of the receiver and the less possibility of an erroneous signal activating or energizing the receiver. In the control of railway trackside devices where quasi-static signals are employed, fast response is not required and these high levels of correlation can be employed.

In order to activate or energize the receiver to produce an output in a high state, the received signal must be continuously proved to be the correct signal and the transmitter, receiver, and transmission medium also have to be continuously proved to be operating correctly. In normal railway terms, if the high state output in the receiver represents a most dangerous or potential wrong side failure mode, then the transmission system must be continuously proved not to have failed to a wrong side mode for the corresponding control signal state to be achieved and held.

The invention may also be applied to a railway track circuit, as shown in FIG. 6, in which the transmitter and receiver comprise the track-circuit feed set and track-circuit receiver, respectively, and the running rails act as the communication medium. The invention provides jointless track circuits which are immune to traction current interference and chopper control impulses, by eliminating cross-talk between track circuit signals.

FIG. 6 shows a railway track circuit in which the running rails 61, 62 are separated from neighboring track sections by conventional insulated joints schematically represented at 63 and 64 at opposite ends of the track section. Railway vehicles may pass through the track section in either direction. A transmitter arrangement 65 is connected to the rails 61, 62 at the left-hand end of the section and a receiver arrangement 66 is similarly connected at the right-hand end of the section. Transmitter 65 comprises a substantially conventional track circuit feed set 67 which is supplied with a signature comprising a digital word 68 generated by signature generator 69. Although not shown in detail in the drawing, generator 69 comprises a digital memory, in which the digital word 68 is stored, an output register for reading the signature from the memory and supplying it to the track feed set 67 under continuously cycling control from a clock pulse generator. An error generator 72 is also connected to signature generator 69 and is arranged to produce a periodic error, by inverting one bit of the signature, as has already been described.

The receiver arrangement 66 at the opposite end of the track section also comprises a substantially conventional track circuit receiver 70 connected across running rails 61, 62. Track receiver 70 couples the received track circuit signal to a signature checker 71 which is responsive to the characteristic signature of the track circuit and which produces high output only when the characteristic signature signal is received, and a low output when it is absent or contains errors. The signature checker 71 also includes a digital memory device for storing the digital signature word and comparator means operative to compare a received signature with the stored version. If the received signal is free of interference, the output of signature checker 71 should correspond exactly to the output of signal generator 69 as corrupted by error generator 72 in transmitter 65. The reproduced error pattern is checked by an error checker 73 and assuming that correlation is achieved, track relay 74 connected to the output is energized. The connection 75 indicates a further check to ensure that all m bits of the signature are corrupted once in every m.n. frames.

As in normal track circuit operation, when the track section is unoccupied, transmitter 65 communicates its signal to receiver 66 and causes relay 74 to be energized. When the track circuit is occupied, rails 61, 62 are electrically shorted together preventing transmitter current from reaching the receiver. Thus in this case the receiver will not respond to the track circuit signature, and the relay 74 will release.

In order to optimize transmission characteristics of track sections, it is preferable to use an alternating current (A.C.) track circuit configuration in which the characteristic digital signal signature is used to modulate an A.C. signal. Therefore, the track circuit shown in FIG. 6 would also include, within the track circuit feed set 67, an A.C. carrier signal generating means and modulating means responsive to the digital signal 68. At the opposite end of the track section, receiver 66 includes carrier signal receiving means and demodulating means to provide the input to the signature checker 71. In a center fed track circuit, transmitter 65 is connected to the rails 61 and 62 at the midpoint between joint locations 63 and 64 with receiver arrangements 66 at opposite ends. Each receiver has a track relay 74 and both relays must be energized to prove that the track circuit is unoccupied.

Transmitter 65 and/or receiver 66 may be provided at wayside locations, in which case only the occupancy indicating signal from track relay 74 is connected to the railway interlocking means. Alternatively, transmitter 65 and/or receiver 66 may be provided at locations remote from the track circuit which may be incorporated as part of the railway signal interlocking means. It follows therefore in an arrangement such as this that the functions of the digital circuits in the generating means 65 and/or the responsive means 66 may be performed by means comprising part of electronic or computer-based interlocking means.

In a system embodying communication channel checking as described, standardization of component blocks, particularly signature generators, is possible by incorporating microprocessors which may be programmed to reproduce an individual characteristic signature as required. Similarly, the signature detectors in the signal responsive means may also include a microprocessor. Furthermore, the controls for the corruption of the signature may also be stored in a microprocessor.

Although we have herein shown and described only two forms of the communication channel vital checking apparatus embodying the invention, it is to be understood that various changes and modifications therein within the scope of the appended claims are part of the spirit and scope of our invention.

Having thus described our invention, what we claim and desire to protect by Letters Patent is:

1. Vital transmission checking apparatus for a communication system, in which function information is transmitted from a first location to a second location over a selected communication channel, comprising,
   (a) a first generating means at said first location operable for generating, at a predetermined repetition frequency, a preselected multi-digit signature code representing a two-state function,
   (b) error generating means coupled to said first generating means and operable for periodically corrupting the generated signature code in a preselected sequential error pattern at a second repetition frequency lower than said predetermined repetition frequency,
   (c) transmitter means coupled to said channel and controlled by said first generating means for continuously transmitting the signature code output with periodic corruptions to designate a first state of said function,
   (d) a control switch means coupled for inhibiting the transmission of said signature codes when said function is in a second state,
   (e) receiver means coupled to said channel at said second location for receiving the signature codes transmitted by said transmitter means.
   (f) signature detection means coupled to said receiver means and responsive to received codes for producing a first output only when correct signature codes representing said function are received and a second output when a corrupted code is received, and
   (g) error detection means coupled to said signature detection means to receive both outputs and responsive thereto for producing a function output to register said first state of said function only when said first output is present and the sequential error pattern is correct,
      (1) said second state of said function being registered when the error pattern is incorrect or in the absence of any received codes.

2. Transmission checking apparatus as defined in claim 1 in which said signature detection means includes,
   (a) memory means for storing the correct signature code pattern,
   (b) comparator means coupled to said memory means and to said receiver means for comparing the pattern of each received code with the stored code pattern, and
   (c) output means controlled by said comparator means for supplying a first or a second output as each received code pattern compares or differs from, respectively, the stored pattern.

3. Transmission checking apparatus as defined in claim 2 in which said error detection means includes,
   (a) a first means for detecting that the corrupted codes occur at said second repetition frequency,
   (b) ratio means coupled for checking the ratio of correct signature codes to corrupted codes received,
   (c) a second means for checking that the error pattern sequence during each cycle of received corrupted codes is correct, and
   (d) output means responsive to said first, ratio, and second means and coupled to said signature detection means for supplying an output to register said first state of said function only when a first output is received from said signature detection means and all corrupted codes have a correct pattern, frequency, and ratio to signature codes.

4. Transmission checking apparatus as defined in claim 3 in which,
(a) said communication channel comprises the rails of a separate railroad track section,
(b) said transmitter means is coupled to said rails at one end of said section for supplying said digital codes to said rails as train detection current in an associated track circuit,
(c) said switch means comprises a shunt between said rails normally formed by the wheels and axles of a train occupying said section, and
(d) said receiver means is coupled to said rails at the other end of said section for receiving the coded track current signals, whereby the output of the corresponding error detection means registers a first function state of an unoccupied track section and the absence of correct codes or any code signals registers the track section occupied.

5. Transmission checking apparatus as defined in claim 1 in which,
(a) said communication channel comprises the rails of a separate railroad track section,
(b) said transmitter means is coupled to said rails at one end of said section for supplying said digital codes to said rails as train detection current in an associated track circuit,
(c) said switch means comprises a shunt between said rails normally formed by the wheels and axles of a train occupying said section, and
(d) said receiver means is coupled to said rails at the other end of said section for receiving the coded track current signals, whereby the output of the corresponding error detection means registers a first function state of an unoccupied track section and the absence of correct codes or any code signals registers the track section occupied.

6. Vital communication apparatus for transmitting selected digital codes, representing the state of a function, over a communication channel from a first location to a second location, comprising,
(a) transmitter means coupled at said first location for transmitting digital signature codes over said channel,
(b) a pattern generator coupled to said transmitter means for generating, at a first repetition frequency, the digital signature code pattern to be transmitted in accordance with the existing state of the function,
(c) an error generator coupled to said pattern generator for periodically corrupting the transmitted signature code in a preselected sequential error pattern at a second repetition frequency less than said first repetition frequency,
(d) receiver means coupled to said channel at said second location for receiving said signature and periodic corrupted codes transmitted by said transmitter means,
(e) signature detector means storing signature code patterns representing predetermined function states and coupled to said receiver means for producing a function state output in accordance with comparisons to the signature code patterns received and an error output when a corrupted code is received, and
(f) an error detector means coupled to said signature detector means and responsive to said function state and error outputs for producing a receiver output to register the function state only when the frequency and sequence of the detected error code pattern is correct and a function state output is present.

7. Vital communication apparatus as defined in claim 6 in which,
(a) a first state of the transmitted function is represented by a continuously repeated selected signature code,
(b) a second state of said transmitted function is represented by the absence of a correct or any signature code, and
(c) said error detector means produces an output representing said first state only when the received signature code and error patterns are correct.

8. Vital communication apparatus as defined in claim 7 in which,
(a) said signature detector means includes a memory and comparator means storing a correct signature code representing said first state of the transmitted function and coupled to said receiver means for comparing the received signature code and said stored code to produce an output only when the compared codes are equivalent,
(b) said error detector means is coupled to said memory and comparator means for detecting each corrupted signature code received and checking the error pattern, and
(c) said error detector means produces an output signal indicating the first state of said function only when errors received follow said preselected error pattern, the absence of an output indicating the second state of said function.

9. Vital communication apparatus as defined in claim 6 in which,
(a) each function has a plurality of states each represented by a selected different signature code, one state being the most safe state of said function assumed in absence of a correct error pattern or any signature code,
and in which both said detector means jointly comprise,
(b) memory and comparator means storing signature codes, one representing each function state, coupled to said receiver means for comparing a received code with the stored codes and producing a selected output indicating the transmitted function state when comparison exists and another output when a corrupted code is received,
(c) a logic network coupled to said memory and comparator means for processing said selected and other outputs to derive the error pattern received, and
(d) output means controlled by said logic network for registering the transmitted function state when a correct error pattern is derived and a comparison with a stored code exists, said output means otherwise registering the most safe state of said function.

10. Vital communication apparatus as defined in claim 9 in which, (a) said function has two states, one represented by a continuously repeated signature code and the other represented by continuously alternating said signature code and the inverse thereof,
(b) said memory and comparator means stores said signature code and said inverse code and produces a first or second output as the received code is said signature code or said inverse code, respectively, the absence of any output indicating the reception of a corrupted code,
and in which said logic network comprises, (c) a first and a second AND gate coupled for receiving said first and second output, respectively, from said memory and comparison means, (d) a logic switching means controlled by said AND gates for producing a first output when only said signature code is received and the detected error pattern is correct, and producing an additional second output when an inverted code is alternately received and said error pattern is correct, and (e) said output means coupled to said logic switching means for registering said one state of said function when said first output is present and registering said other state of said function when both outputs are present, said output means registering a transmission fault condition in the absence of both outputs.

* * * * *